(No Model.) 2 Sheets—Sheet 1.
T. A. EDISON.
ELECTRIC GENERATOR.
No. 434,586. Patented Aug. 19, 1890.
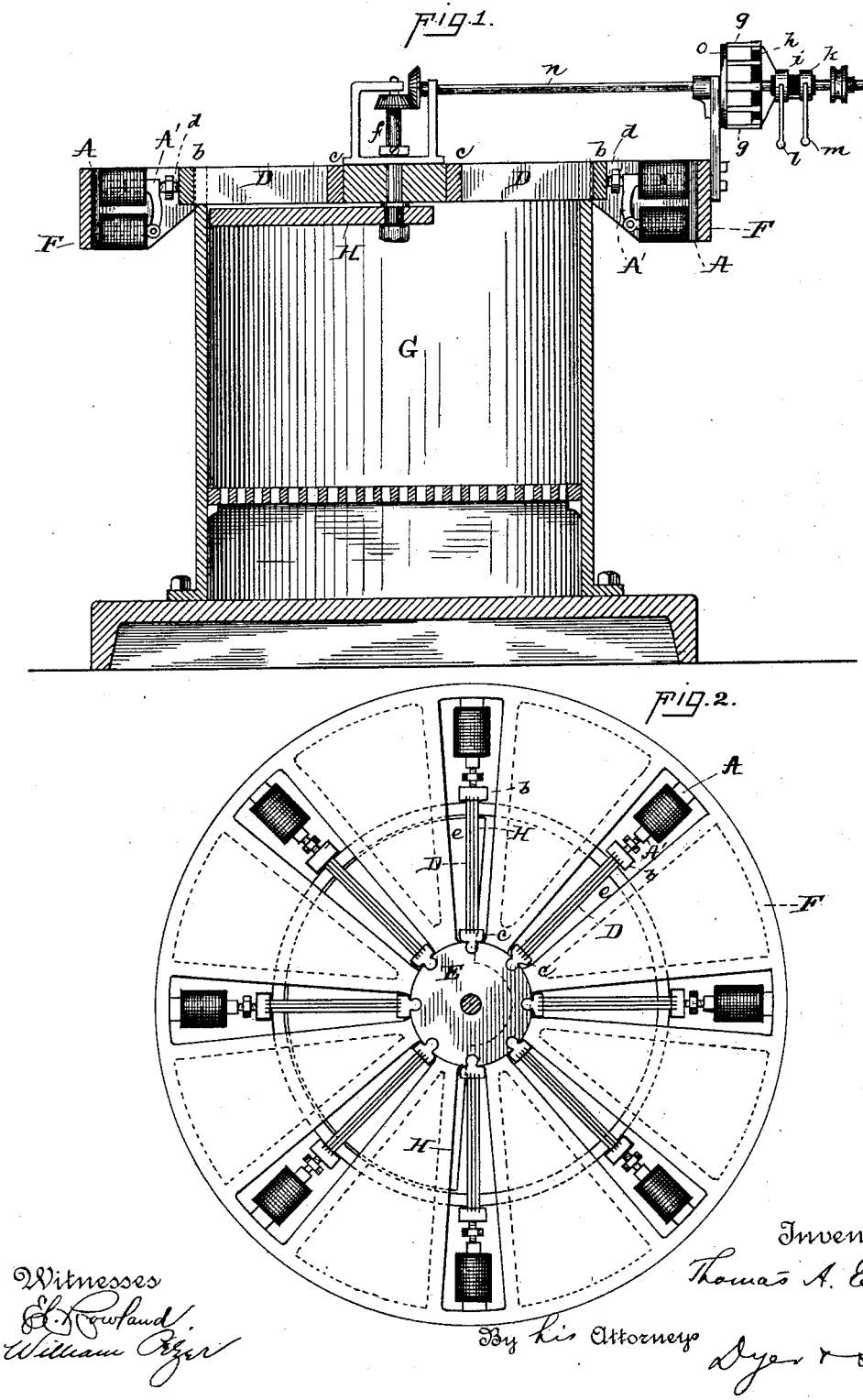

(No Model.) 2 Sheets—Sheet 2.
T. A. EDISON.
ELECTRIC GENERATOR.
No. 434,586. Patented Aug. 19, 1890.
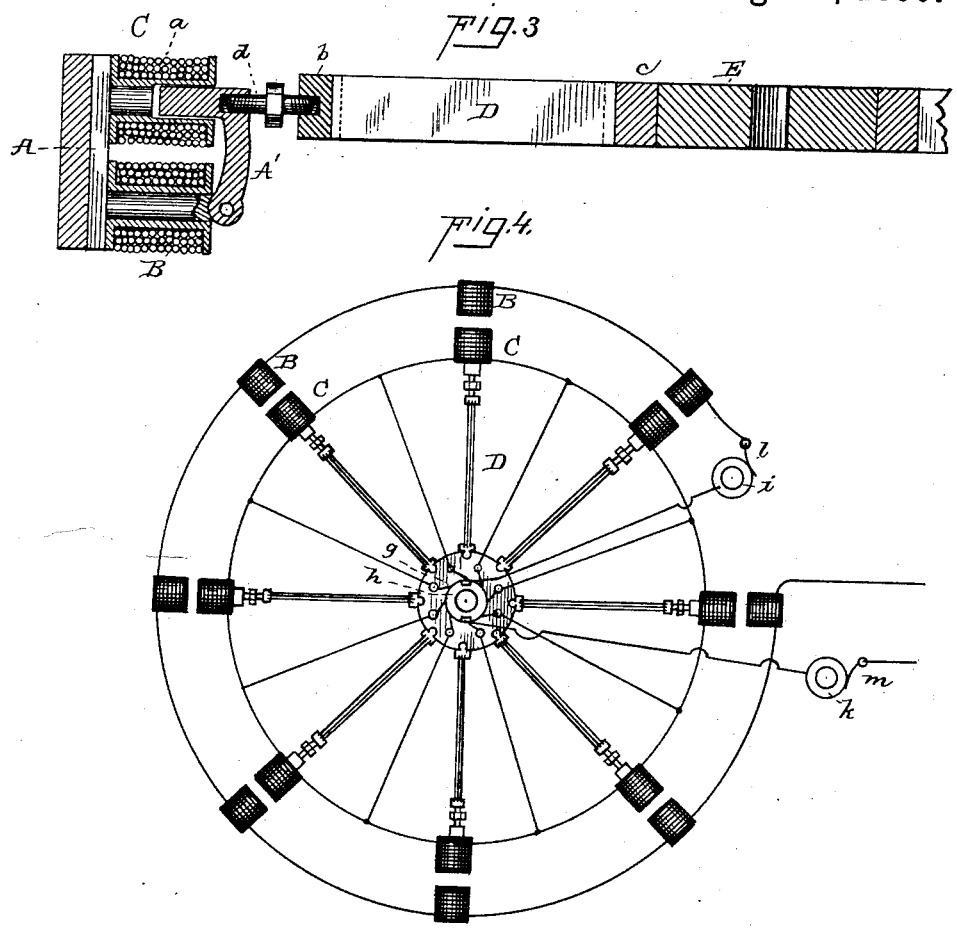
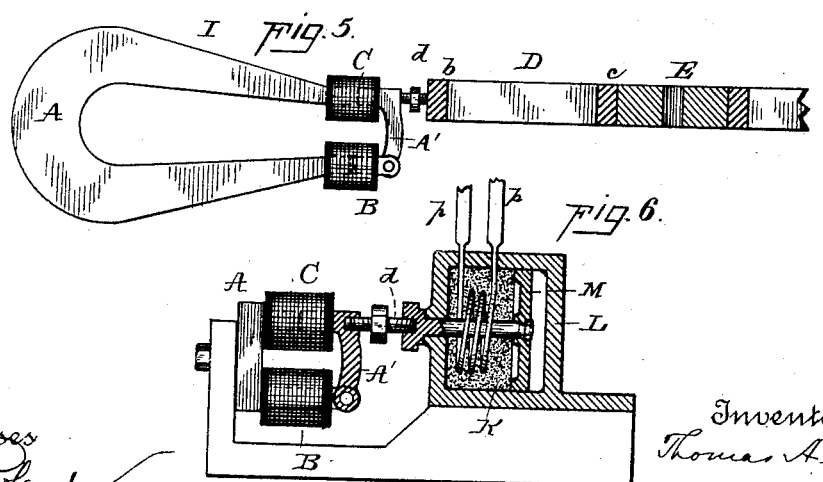

UNITED STATES PATENT OFFICE.

THOMAS A. EDISON, OF LLEWELLYN PARK, NEW JERSEY.

ELECTRIC GENERATOR.

SPECIFICATION forming part of Letters Patent No. 434,586, dated August 19, 1890.

Application filed January 30, 1888. Serial No. 262,429. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Electrical Generators, (Case No. 752,) of which the following is a specification.

The object of my invention is to transform the heat energy of coal and other heat-producing fuel directly into electricity without the intervention of a steam-engine or other prime motor.

The invention consists, primarily, in applying the force which is obtained by the expansion and contraction of materials under variations of temperature to produce movements causing magneto-electric induction; further, in applying the movements so produced to open and close a magnetic circuit and to thereby induce currents in a conductor within the influence of a magnetic field so varied; further, in arranging a number of such simple elements together in connection with a source of heat and a suitable moving directing device or devices, whereby the heat will be applied to the elements successively in any desired way, and the effect from a number of such elements in the form of continuous or alternating currents in the same circuit can be obtained; further, in using in connection with the several simple elements so grouped together and heated successively a commutator for producing from the several simple elements a continuous current or one of the same direction, and, further, in the various novel details of construction or arrangement and in the several novel combinations of parts, all as more fully hereinafter explained, and pointed out by the claims.

Many attempts have been made heretofore to utilize in the operation of prime motors the expansion and contraction of solid matter; but the expansion and contraction between practicable limits is so small that no mechanical means has as yet been obtained which would utilize these small movements for practical purposes. The problem is to transform the exceedingly small movements, which can be obtained by the expansion and contraction of solid matter due to variations in temperature, into energy capable of practical use. I have solved this problem by the invention herein described, and I am enabled thereby to utilize with great economy of fuel the barely-perceptible movements of expansion and contraction for the production of light and power. This I do by applying the movements to the opening and closing of a magnetic circuit. The efficacy of this arrangement is based upon the fact that the resistance of air to magnetic lines of force or stress is about twelve hundred times that of soft iron. If short stout magnets are divided into two parts with their faces accurately ground to fit together like two surface-plates and are magnetized nearly to saturation, an enormous force is required to pull them apart and open the magnetic circuit; but if the faces are separated even to the slightest extent—say one two-hundredth part of an inch—the attraction is reduced enormously on account of the interposition in the magnetic circuit of a layer of air whose specific resistance to magnetic stress is twelve hundred times greater than the iron. I have found that a large percentage of the force required to entirely open the magnetic circuit must be expended in producing this first slight separation of the surfaces, and hence the energy to be gained by a further separation of the surfaces is of much less importance.

If the magnetic circuit be covered in part by wire through which a current is passed, it can be magnetized, and if it is also covered in part by other wire, particularly in the vicinity of the rupture of the circuit, powerful induction waves will be produced in the latter coils of wire when the magnetic circuit is opened or closed to the slight extent stated. This small movement being within the practical limits of the expansion and contraction of solid matter, I am thus enabled to obtain the full value of the almost irresistible force of expansion in solids for practical purposes.

The invention will be better understood by reference to the accompanying drawings, in which—

Figure 1 is a vertical section of an apparatus embodying the invention. Fig. 2 is a top view of the same with the horizontal shaft removed. Fig. 3 is a sectional view showing one element of the apparatus. Fig. 4 is a view illustrating circuit-connections. Fig. 5 is a view in section of one element, showing the use of a permanent magnet in place of an electro-magnet; and Fig. 6 is a view similar to Fig. 5, showing the use of a liquid as the expansible body.

Each element of my generator is a magnetic circuit A, one portion A′ of which is pivoted upon the part A, the movements of the pivoted part A′ upon the part A producing the opening and closing of the magnetic circuit at the point $a$, the surfaces at $a$ being fitted accurately together. One side of the magnetic circuit is covered with energizing-coils B, while the other side, covering the point $a$, at which the magnetic circuit is opened and closed, is provided with the coils C in which current is induced. Thus it will be seen that the magnetic circuit is opened and closed directly within the coils C. The touching of the surfaces at $a$ causes the lines of magnetic force to travel almost entirely through the iron forming the magnetic circuit, while the separation of such surfaces even to the slightest extent causes the lines of magnetic force to strike out through the surrounding coils C and thus induce current in such coils. These lines of force are again withdrawn by the closing of the magnetic circuit, and thus a current of one direction is induced in the coils C when the magnetic circuit is opened and a current of the other direction is induced in coils C when the magnetic circuit is closed.

To move the pivoted part or keeper A′ of the magnetic circuit I attach to such part A′ a number of sheets D of metal—say of nickle—which are secured to end pieces $b\ c$. Entering the end piece $b$ and the keeper A′ and connecting them together is a bolt $d$, provided with right and left hand screw-threads where it enters the parts, and also provided with a nut by which it can be turned, so that the parts can be given the proper relative adjustment. The end piece $c$ is set into the central hub E. A number of these elements are mounted in openings $e$ in the top plate F of the furnace G, the top plate extending beyond the sides of the furnace, so as to keep the magnets away from the heat of the furnace and to permit them to be kept cool by the direct circulation of air around them.

The products of combustion from the furnace G pass up through the openings $e$ in the top plate F around the expansible bodies D, and thus such bodies are heated. When the bodies D are cold, or not subjected to the direct action of the products of combustion, the magnetic circuits are opened, the expansible bodies being maintained under stress by the magnetic attraction which tends to close the magnetic circuits. H is a revolving shield or director of the heat. This is mounted upon a shaft $f$, passing vertically through the hub E and carrying the shield H on its lower end within the furnace. This shield H covers, preferably, one-half of the openings $e$ in the top plate, and it being revolved slowly it will successively close the openings on its advancing side and open those on its retreating side. Thus one-half of the expansible bodies will be cooling while one-half will be heating, those that are cooling producing a current in one direction while those that are heating are producing a current in the other direction in the coils C.

For producing a continuous current, the coils C are connected together in a closed circuit, as shown in Fig. 4, while between the coils connections are made to commutator-springs $g$, resting on a disk $h$. This disk is of insulation except at two opposite points in its periphery, where it is provided with plates of metal. These plates of metal are connected with two rings $i\ k$, upon which rest springs $l\ m$. The springs $g$ being stationary and the disk $h$ being rotated, the main circuit will be connected with the coils C through those springs $g$ which rest upon the metal blocks in the disk $h$, and thus the circuit-connections will be advanced with the movements of the shield H and a continuous current will be produced at the springs $l\ m$. To take the commutator away from the influence of the heat, I provide a horizontal shaft $n$, which is connected by beveled gear with the vertical shaft $f$ and has the same speed. A plate $o$, carrying the stationary springs $g$, is mounted upon the outer bearing of this shaft. These parts are shown in diagram in Fig. 4.

For energizing the coils B a separate source of energy may be used, or the coils may be supplied directly from the apparatus itself, as shown in Fig. 4, a galvanic battery being used to energize the coils in starting and being afterward removed from the circuit when the machine is started. It is evident, however, that permanent magnets I, Fig. 5, may be used in place of the electro-magnets. It is also evident that many forms of the expansible body can be utilized, and that tubes, wires, or other constructions may be used in place of sheets; but I prefer a divided body or one having thin walls, so that it can be quickly heated and cooled.

Instead of using solids for the expansible body, I may use a liquid K, as shown in Fig. 6, the expansion being produced by hot water or steam passed through copper pipes $p$, coiled in a chamber or cylinder L, in which the liquid K is placed. The expansion and contraction of the liquid produce movements of the piston M, which is connected by its piston-rod with the keeper A′ of the magnet.

What I claim as my invention is—

1. The combination, with a magnet and a conductor within the influence of the field of force of said magnet, of a body which is caused to expand and contract by variations of temperature and acts to produce movements at such field of force, whereby electric currents are induced in the said conductor, substantially as set forth.

2. The combination, with a magnetic circuit and a keeper therefor adapted by its movement to open and close said circuit, of a co ductor within the influence of the field of force of such magnetic circuit, and a body expanded and contracted by variations in temperature and connected with said keeper, whereby the movements caused by the expansion and contraction of said body will open and close such magnetic circuit and induce electric currents in said conductor, substantially as set forth.

3. The combination, with two or more magnetic circuits and movable keepers adapted to open and close such magnetic circuits, of conductors within the influence of the fields of force of such magnets, and two or more bodies expanded and contracted by variations of temperature connected with said keepers, and circuit-connections with the conductors in the fields of said magnets, substantially as set forth.

4. The combination, with two or more magnetic circuits and movable keepers adapted to open and close such magnetic circuits, of conductors within the influence of the fields of force of such magnets, two or more bodies expanded and contracted by variations of temperature connected with said keepers, and a commutator for producing a continuous current from the impulses in such conductors, substantially as set forth.

5. The combination, with a source of heat, of two or more expansible bodies, a heat-director directing the heat to such bodies successively, and two or more magnetic circuits opened and closed by such expansible bodies, and thereby producing currents in conductors within the influence of the fields of force of such magnets, substantially as set forth.

6. The combination, with a source of heat, of two or more expansible bodies, a heat-director directing the heat to such bodies successively, magnets whose magnetic circuits are opened and closed by the movements of such expansible bodies, conductors within the influence of the fields of force of such magnets, and a commutator for straightening the currents induced in such conductors, substantially as set forth.

7. The combination, with a body expanded and contracted by variations in temperature, of a magnet, a movable keeper for such magnet, and an adjustable connection between such expansible body and said movable keeper, substantially as set forth.

8. The combination, with a body expanded and contracted by variations of temperature, of a magnet, a movable keeper therefor connected with said expansible body, for opening and closing the magnetic circuit by the movements of said expansible body, and a coil of wire surrounding the break in the magnetic circuit for receiving the induction from the magnet, substantially as set forth.

This specification signed and witnessed this 21st day of January, 1888.

THOS. A. EDISON.

Witnesses:
WILLIAM PELZER,
E. C. ROWLAND.